March 4, 1969 W. T. GLASSPOOL 3,431,434

ACTIVE FILTER

Filed March 24, 1967

INVENTOR
WILLIAM T. GLASSPOOL
BY Irving S. Rappaport
ATTORNEY

United States Patent Office 3,431,434
Patented Mar. 4, 1969

3,431,434

ACTIVE FILTER

William T. Glasspool, Goleta, Calif., assignor to Raytheon Company, Lexington, Mass., a corporation of Delaware Filed Mar. 24, 1967, Ser. No. 625,663
U.S. Cl. 307—233 10 Claims
Int. Cl. H03k *5/20;* H03b *1/04*

ABSTRACT OF THE DISCLOSURE

An active filter device for power lines to filter out low frequency current fluctuations, especially on AC lines, at frequencies close to the power line fundamental frequency. The unwanted power line current fluctuations are filtered from the power line by active and passive filters. The current fluctuations on the power line are sensed and used as a current fluctuation correction input to the active filter control loop. In the case of alternating-current power lines, the fundamental power-line frequency is removed from the correction signal by means of a tuned circuit with a narrow pass-band. The correction signal, then consisting only of unwanted frequency components, is used to control a transistor, vacuum tube or other active device connected in such a manner that a load current will be drawn from the power line which is opposite in polarity to the unwanted fluctuations, thus effectively cancelling them.

*Background of the invention*

This invention relates to filter networks and more particularly to an active filter circuit for reducing current fluctuations in a power line due to changes in load conditions. An examination of conducted power line noise produced by electrical equipment has shown that voltage and current disturbances with frequency components extending from below the power-line frequency into the upper microwave region can be generated. In many instances, it is very desirable to suppress this noise. Frequencies above about 10,000 c.p.s. can be readily filtered by the use of simple inductance-capacitance networks. For frequencies below 10,000 c.p.s., two major problems exist with this type of filter; inductors and capacitors become physically large and inductor saturation effects can product undesired changes in cut-off frequency.

It can be shown by an examination of power line waveforms that in the lower frequency region where power-line impedances are very low, the noise voltages on a power-line are inconsequential compared to the noise currents flowing in the same line. It is concluded that in this frequency range, power line noise radiation (other than power-line frequency) will consist predominately of magnetic fields rather than electric fields. Non-proportionality of these fields will exist at all practical distances from the power line because of the large physical wavelengths involved. Since the predominant field is caused by current fluctuations in a power line, then it is very desirable to reduce current fluctuations in a power line when it is desired to reduce power line induced interference with other circuits.

Existing power line filters in use consist of simple inductance and capacitance networks arranged in a low pass configuration. These networks cannot have their cut-off frequency close to the power line fundamental frequency as the breakdown, wattage ratings and physical size of their components would become prohibitively large. In a low pass inductive and capacitive power line filter the load currents flow through the inductors and if saturation effects are to be avoided, then only relatively low values of inductors can be used and the practical filter design is limited to a filter with a cut-off frequency of about 15,000 c.p.s. (for a 60 c.p.s. 100 ampere filter) and consequently noise current frequencies below this are virtually unattenuated.

As the majority of low frequency noise on a power-line is the result of current variations and since the use of conventional filtering is prohibited by the size of components, other methods of noise suppression have been considered. The following methods are amongst these: (1) The conversion of A.C. power to mechanical rotation and reconversion back to A.C. power by an alternator. The mechanical inertia of the rotating system acts in this case as a very low pass filter; (2) The conversion of A.C. power to hydraulic fluid flow and reconversion of fluid flow back into power. A fluid reservoir would be provided in the system to act as a low pass filter; (3) The conversion of A.C. power to D.C. power, probably to a higher voltage and lower current to minimize inductor saturation, then by the use of conventional L.C. type electrical filtering and the subsequent reconversion of the D.C. power to A.C. power.

In order to compensate for non-sinusoidal current fluctuations along a power-line, three major approaches were considered: (1) The power-line voltage could be actively increased or decreased to maintain a constant sinusoidal current flow. This solution merely transfers the interference problem to one of fluctuating voltage noise instead of current noise on the power line, and incidentally, very large correction power peaks would be required to correct for the line current noise fluctuations since the power line impedance is very low; (2) The power-line RMS source voltage can be increased, and a series load provided to reduce the voltage at the equipment back to its original level. The series load would then be varied instantaneously to compensate for fluctuations in equipment load currents. This approach is not desirable as the equipment using the power line would be provided with a fluctuating voltage supply for which it was not designed; (3) An auxiliary load could be provided which would draw an additional load current from the power-line. When the equipment connected to the line has a current increase or decrease, the auxiliary load would be varied instantaneously and oppositely to the equipment fluctuating load current. When an alternating supply is being employed, the sinusoidal powerline frequency must not be compensated. This necessitates the use of a power-line frequency filter incorporated into the auxiliary load control circuit to prevent fluctuations of the auxiliary load at the power frequency.

This third approach was considered the best practical method and it is the approach which is used as the basis for the present invention.

An object of the present invention is to provide an active filter for use with power lines.

Another object of the present invention is to provide an active filter for reducing current fluctuations in a power line due to changes in load conditions.

The filter circuit of the present invention has several advantages over the prior art. The present invention acts to filter from A.C. power lines the low frequencies which are close to the power line fundamental frequency. Amplitude fluctuations of the sinusoidal A.C. power current waveform consist of the fundamental power frequency plus fluctuation sidebands on frequencies above and below it. The present invention can filter out these sidebands and thereby reduce power line amplitude fluctuations to a low level.

*Summary of the invention*

The above objects and advantages are achieved by providing an active filter device for power lines to filter out the low frequencies close to the power line fundamental frequency. A current sensing device is provided having a very low resistance to sense the current flow and develop a voltage in a transformer. This voltage is applied to a tuned network with output frequencies above and below the power line frequency. The outputs are applied to an amplifier and then to a transistor emitter-follower circuit in such a polarity that a fluctuation in equipment load current will cause the transistor output currents in the auxiliary loads across the line to compensate by appropriate cancellation.

The invention uses an auxiliary load across the power line to be filtered. The auxiliary load is dynamically adjusted in synchronism with power line current changes and absorbes more or less power line current in opposition to the current changes which are to be filtered from the power line. Since most power lines carry sinusoidal voltages and currents, the active filter contains a power line fundamental frequency filter which allow sinusoidal current fundamental frequencies to flow in the power line without cancellation.

The present invention may be employed in such an application as radio frequency shielded room power line filters. It may also be used in filters for use on equipment or machinery where it is desirable to prevent load current fluctuations from being observed at any point along the power line where such fluctuations could cause interference with other operations or could provide information as to industrial processing rates or other data which might be considered restricted information.

*Description of the preferred embodiments*

Figure 1:
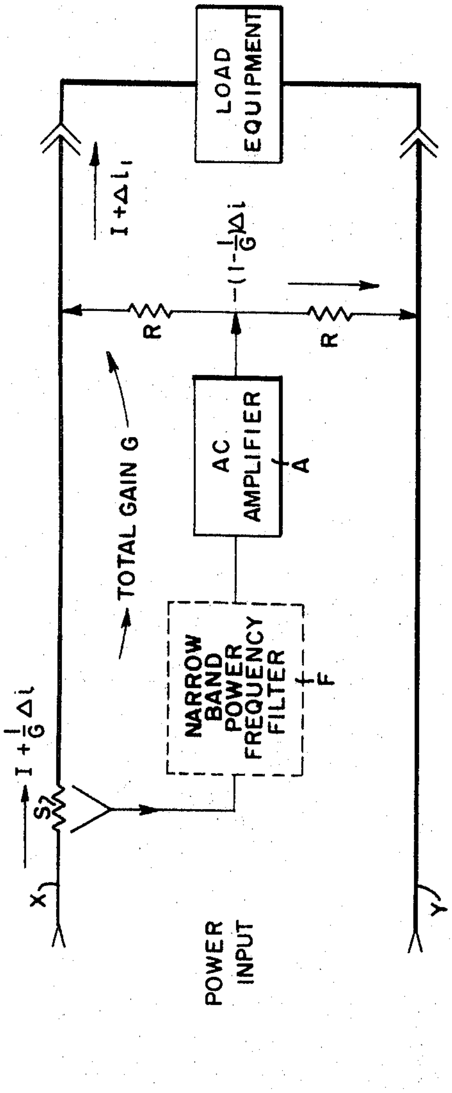
FIG. 1 shows a circuit embodying the concept of the present invention.

FIG. 1 shows a block diagram embodying the concept of the present invention as it may be employed with either D.C. or A.C. power lines. The power input is transferred via leads X and Y and a current sensing device S into the load equipment. The load equipment uses an allowable (non-fluctuation) current from the power input which is designated in the illustration as I. In addition, a fluctuation current $\Delta i$ is flowing in leads X and Y. This current is an unwanted or interfering component of the power caused by fluctuations of the equipment load. The sensing device S which may be a resistance, current transformer, Hall effect magnetic field sensor etc., provides a voltage output into an A.C. amplifier A. The A.C. amplifier A increases the amplitude of the sensed voltage or current from sensing device S and causes a current flow of $$-\left(1-\frac{1}{G}\right)\Delta i$$

to apear in the auxiliary load R, where G is the total gain of the system from S to R. Only in the event that the power is from an alternating source, a narrow band filter F (shown dotted) is connected in the circuit to exclude cancellation at the relevant power frequency. Typically, the narrow band filter F is shown connected between the sensor S and the amplifier A. It can be seen that the addition of cancellation current $$-\left(1-\frac{1}{G}\right)\Delta i$$

to the original fluctuation current $\Delta i$ will result in a reduction of fluctuation current flow as seen by the power source. The amount of fluctuation current reduction will be in proportion to the gain of the system from the sensor S to the output R.

In describing the active power line filter circuit of this invention for use with A.C. power lines, it is necessary to define and understand noise generation on an A.C. power line. For the purpose of this discussion, low frequency noise on an A.C. power line is defined as any departure from the A.C. generator voltage waveform, usually sinusoidal, which the voltage or current may make below 20,000 c.p.s. because of variations in equipment loading impedances or because of "induced" voltages or currents within an offending equipment. The equipment load current may be non-sinusoidal for a number of reasons. For example, the current taken by an electric adding machine may vary as the mechanical load on its motor is modified by the arithmetical computation being processed, or the current taken by a typical radio receiver power supply will peak non-sinusoidally as the smoothing capacitors are charged during the rectifier cycle and as the audio amplifier circuits take more or less current during loud sound volume excursions. Since the power line impedance is generally very low, fluctuations in current taken by an equipment load will result in a normally negligibly small voltage fluctuation on the power line at low frequencies.

Figure 2:
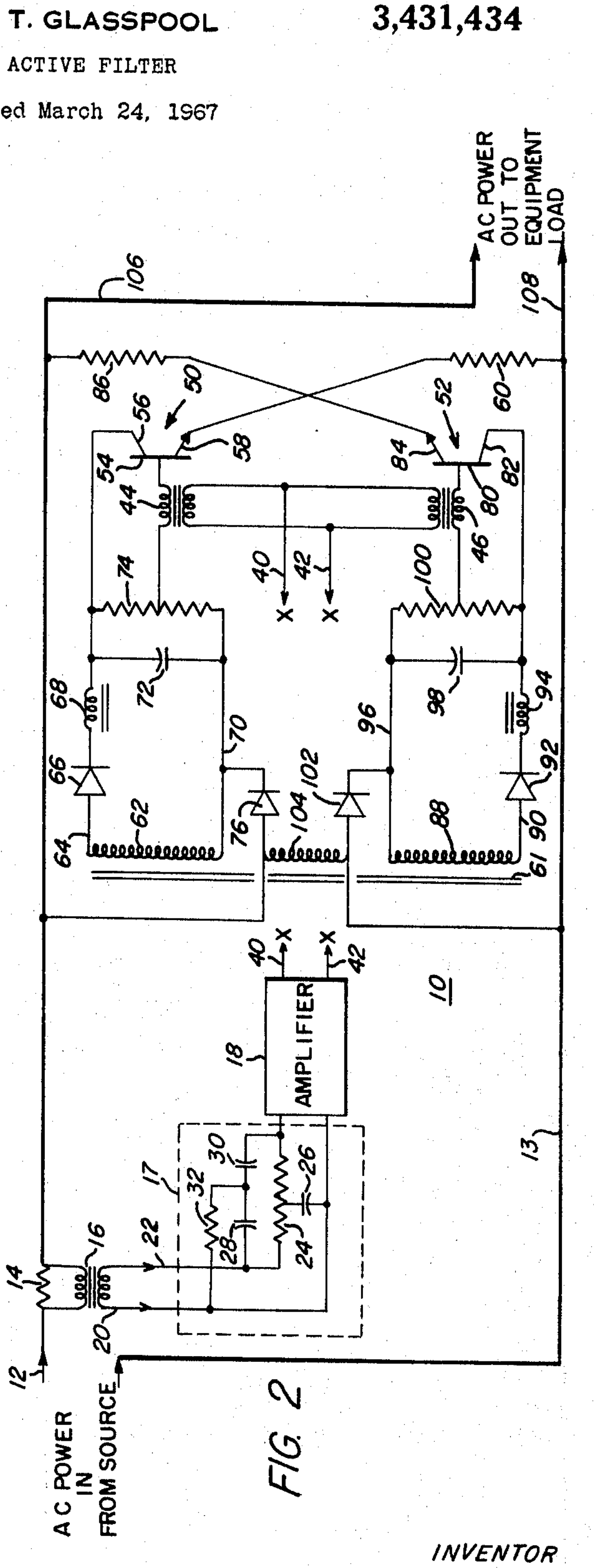
FIG. 2 shows an active filter circuit embodying the present invention for application to a typical A.C. power line.

FIG. 2 shows an active filter 10 of the present invention. A pair of power lines 12 and 13 are supplied with power from an A.C. source. A resistor 14 is connected in series with the power line 12 and serves to sense the current flow in the power line 12. Connected across the resistor 14 is a transformer 16 such that the resistor 14 develops a voltage into the transformer 16 which is proportional at all times to the current flow in the power line 12. The voltage developed in the transformer 16 is applied to a parallel T filter network 17 which is tuned for essentially infinite attenuation at the power line frequency. All frequencies above and below the power line frequency passed by the T network 17 will be applied to a wide band amplifier 18. The amplifier 18 has outputs on lines 40 and 42 as indicated by the letter X. The amplifier 18 may be any type of commonly known amplifier.

The parallel T network 17 has a signal applied thereto from the transformer 16 via lines 20 and 22. Connected in series between the line 22 and the amplifier 18 is a resistor 24 having a capacitor 26 connected at one end across the resistor 24 and at the other end to line 20. The resistor 24 with the capacitor 26 connected in parallel therewith forms one part of the parallel T network 17. A pair of series-connected capacitors 28 and 30 are connected in parallel with the resistor 24. A resistor 32 is connected at one end to the junction between the capacitors 28 and 30 and at the other end to the line 20. The combination of the series-connected capacitors 28 and 30 and the resistor 32 connected to the junction between capacitors 28 and 30 forms the remainder of the parallel T network 17.

The output signals from the amplifier 18 on lines 40 and 42 (indicated by the letter X) are applied to transformers 44 and 46 respectfully. The transformer 44 is connected to an emitter-follower transistor 50 and the transformer 46 is connected to emitter-follower transistor 52.

The transistor 50 has a base electrode 54 to which the transformer 44 is directly connected, a collector electrode 56, and an emitter electrode 58. A resistor 60 connects the emitter electrode 58 of the transistor 50 to the power line 13. A power supply 61 in the form of a transformer winding 62 supplies one half cycle of the alternating input to the load resistor 60 via the transistor 50. Transformer winding 62 is coupled to the collector 56 of the transistor 50 via a lead 64 and is coupled to the base electrode 54 of the transistor 50 via a lead 70. A diode 66 is connected in series with the lead 64 and LC filter, made up of inductor 68 and capacitor 72, is connected between the output of diode 66 and the lead 70. A resistor 74, connected in parallel across the capacitor 72 has a tap connected to the transformer 44. A diode 76 is connected to the end of the transformer winding 62 which includes lead 70 at one end and connected at the other end to the power line 12.

The transistor 52 has a base electrode 80 to which the transformer 46 is directly connected, a collector electrode 82, and an emitter electrode 84. A resistor 86 connects the emitter electrode 84 of the transistor 52 to the power line 12. The power supply 61 in the form of a transformer winding 88 supplies one half cycle of the alternating input to the load resistor 86 via the transistor 52. Transformer winding 88 is coupled to the collector 82 of the transistor 52 via a lead 90 and is coupled to the base electrode 80 of the transistor 52 via lead 96. A diode 92 is connected in series with the lead 90 and LC filter, made up of inductor 94 and capacitor 98, is connected between the output of diode 92 and the lead 96. A resistor 100, connected in parallel across the capacitor 98 has a tap connected to the transformer 46. A diode 102 is connected to the end of the transformer winding 88 which includes lead 96 at one end and connected at the other end to the power line 13. A winding 104 is connected across the inputs of the two diodes 76 and 102 and facilitates the transfer of the alternating inputs from the power lines 12 and 13 through the respective diodes 76 and 102 to the respective transformer windings 62 and 88, each of which provides one half cycle of the alternating input to the load resistors 60 and 86 via the transistors 50 and 52 respectively. A.C. power is supplied to the output load via the power lines 106 and 108 which are connected to the input power lines 12 and 13 respectively.

The operation of the filter circuit of the present invention is as follows. The alternating power is applied to the equipment load virtually unopposed. The very low resistance provided by resistor 14 serves to sense the current flow in the power-line 12 and develop a voltage into transformer 16 which is proportional at all times to power line current flow. This voltage is applied to a parallel T network 17 tuned for infinite attenuation at the power line frequency. All frequencies above and below the power line frequency passed by the filter 17 will be applied to the wide-band amplifier 18 (for example; 2 c.p.s., to 20,000 c.p.s. less 60 c.p.s.). The amplifier output designated XX is applied to emitter-follower transistors 50 and 52 in such a polarity than an increase in equipment load current will cause the current through transistor 50 and the auxiliary load 60 to decrease and the current through transistor 52 and auxiliary load 86 similarly to decrease.

The auxiliary load 86 is supplied with one half cycle of alternating input via transistor 52, and diode 102. The load 60 is similarly supplied with the other half cycle of the alternating input via transistor 50, and diode 76. The two power supplies, including transformer windings 62 and 88, are provided to hold transistors 50 and 52 in Class A operation at all times so that noise cancelling can occur during zero-crossing of the input supply voltage waveform. This is essential since the phase of current drawn by the equipment load can cause current to flow during any portion of the input alternating voltage waveform. By providing the transformer windings 62 and 88 with LC filters made up of inductor 68 and capacitor 72 and inductor 94 and capacitor 98 respectively, the peak currents drawn by transistors 50 and 52 can be supplied from the capacitors 72 and 98 without additional noise being created in the power line. The circuit is in effect a closed loop feedback system and the ability to filter is proportional to the gain of the amplifier 18, filter 17, and transistors 50 and 52.

Depending on the parameters chosen for the active filter 10, almost any equipment load can be tolerated by the filter. Its limitations would be set by the current handling capacity of the resistor 14 and the size of the wire connecting the filter input and output. If the active filter 10 is to be connected to a single equipment, its size or rating would be a function of the current non-sinusoidal fluctuations expected from that equipment rather than the equipment mean power rating. In usual prior art equipment, the rating of an LC type R.F.I. shielded room power-line filter is dependent on the total current in the line including such resistive loads as lighting, heating, etc., the resistive loads do not normally cause R.F.I. As opposed to this, the rating of an active filter on the power line need only allow for those items of equipment in the room which draw non-sinusoidal currents which have to be corrected. When a number of noise generating equipments are connected on to single line to be filtered, then the active filter need only be rated at the overall noise fluctuation currents in the line which will be much less than the peak sum of all fluctuation currents.

Active filters, as described, can be made for any normal power voltage. When correction voltages across auxiliary loads 60 and 86 are likely to exceed the breakdown ratings of transistors 50 and 52 then the auxiliary loads 60 and 86 could be returned to taps on the primary of transformer 61. By this arrangement, voltages on transistors 50 and 52 can be reduced while current is proportionally increased.

Where large deviations in power supply frequency are experienced, a discriminator which is controlling reactances in the parallel T filter circuit 17, could be employed to keep the filter tuned at all times to the frequency of the supply. Such a device would not be required in areas where industrial power is used, as the power frequency would normally be held very closely to a single frequency.

A number of these active filters as described in the present invention could be employed in series where a particularly critical application exists. Another method of employment of the present invention might be to provide each of a number of equipments with its own filter and then provide an additional filter to the common power-line supplying the area.

I claim:

1. An active filter circuit for use with power lines to filter out the low frequencies close to the power line fundamental frequency, said circuit comprising:

means for sensing current flow in the power line;
means for developing a voltage from the current sensed by the sensing means which is proportional to the power line current;
filtering means for filtering the output from the voltage developing means, said filter means being tuned for essentially infinite attenuation at the power line frequency;
amplifying means for amplifying all frequencies above and below the power line frequency which are passed by the filtering means;
auxiliary leads connected across the power lines; and
circuit means to which the output of said amplifying means is applied in such a polarity that a fluctuation in load current will cause the outputs from said circuit means coupled to said auxiliary loads in the lines to compensate for the fluctuation by appropriate cancellation.

2. A filter circuit as set forth in claim 1 wherein said sensing means is a resistor connected in series with the power line.

3. A filter circuit as set forth in claim 1 wherein said voltage developing means includes a transformer which is connected in parallel across said sensing means.

4. A filter circuit as set forth in claim 1 wherein said filtering means includes a parallel T filter network connected to the output of said voltage developing means.

5. A filter circuit as set forth in claim 4 wherein said parallel T filter network includes a resistor-capacitor T combination and another T combination having a pair of series-connected capacitors and a resistor connected to the junction between said series-connected capacitors, said another T combination being connected in parallel with said resistor-capacitor T combination.

6. A filter circuit as set forth in claim 1 wherein said circuit means includes a pair of emitter-follower transistors, said transistors having the output of said amplifying means applied thereto, said transistor outputs being coupled to said auxiliary loads in the line to compensate for fluctuations in load current by appropriate concellation.

7. A filter circuit as set forth in claim 6 wherein said transistors each have base, collector and emitter electrodes, a source of power including a transformer winding is coupled between the base and collector electrodes of each of said transistors, each of said transformer windings is coupled to the power line and each auxiliary load is connected between the emitter electrode of one of said transistors and one of the power lines.

8. An active filter circuit for use with power lines to filter out the low frequencies close to the power line fundamental frequency, said circuit comprising:

a resistor connected in series with one of the power lines for sensing current flow in the power line;

a transformer connected in parallel across said resistor for developing a voltage from the current sensed by said resistor which voltage is proportional to the power-line current;

a parallel T filter network connected to the output of said transformer, said filter network being tuned for infinite attenuation at the power line frequency and including a resistor-capacitor T combination and another T combination having a pair of series-connected capacitors and a resistor connected to the junction between said series-connected capacitors, said another T combination being connected in parallel with said resistor-capacitor T combination;

an amplifier connected to said parallel T filter network for amplifying all frequencies, above and below the power-line frequency, which are passed by the filter network;

auxiliary loads connected across the power lines;

a pair of emitter-follower transistors, said transistors each having base, collector and emitter electrodes, the output of said amplifier applied to the base electrode of each of said transistors;

a source of power including a transformer winding coupled between the base and collector electrodes of each of said transistors, each of said transformer windings being coupled to the power lines so that each transformer winding supplies one half cycle of an alternating signal to the corresponding transistor; and each auxiliary load is connected between the emitter electrode of the one of said transistors and one of the power lines, the output of said amplifier being applied to said transistors in such a phase that a fluctuation in load current causes the outputs from said transistors coupled to said auxiliary loads in the lines to compensate for such fluctuation by appropriate cancellation.

9. A filter circuit as set forth in claim 8 wherein an increase in load current causes the current through each transistor and its corresponding auxiliary load to decrease.

10. A filter circuit as set forth in claim 8 wherein a decrease in load current causes the current through each transistor and its corresponding auxiliary load to increase.

References Cited

UNITED STATES PATENTS

| | | | |
|---|---|---|---|
| 2,852,622 | 9/1958 | Fedde et al. | 328—165 X |
| 3,050,676 | 8/1962 | Atherton et al. | 323—66 |
| 3,058,113 | 10/1962 | Wilson | 328—165 X |
| 3,283,177 | 11/1966 | Cooper | 307—232 |
| 3,296,463 | 1/1967 | Brault | 307—295 X |

JOHN S. HEYMAN, *Primary Examiner.*

U.S. Cl. X.R.

307—232, 297; 323—66; 328—167